United States Patent [19]

Gravino

[11] Patent Number: 5,467,621

[45] Date of Patent: Nov. 21, 1995

[54] LOCKABLE CLOSURE FOR A FUEL TANK FILLER PIPE

[75] Inventor: Marc C. Gravino, Rockford, Ill.

[73] Assignee: Trilby, Ltd., Rockford, Ill.

[21] Appl. No.: 194,499

[22] Filed: Feb. 10, 1994

[51] Int. Cl.[6] .................... B65D 41/04; B65D 55/14
[52] U.S. Cl. .................... 70/171; 70/158; 70/165; 296/97.22; 220/86.2; 220/DIG. 33
[58] Field of Search ............... 70/158, 159, 164, 70/163, 165, 166, 167, 170, 171, 172, 173; 220/86.2, 86.3, DIG. 33, 284; 141/312, 348–350; 296/97.22

[56] References Cited

U.S. PATENT DOCUMENTS

| | | |
|---|---|---|
| 1,902,456 | 3/1933 | Matthews. |
| 2,109,137 | 2/1938 | Marsh ............................ 70/159 |
| 2,247,509 | 7/1941 | Lebus ............................ 220/86.2 |
| 2,503,031 | 4/1950 | Davidson ...................... 220/35 |
| 4,091,959 | 5/1978 | O'Banion ...................... 220/304 |
| 4,342,208 | 8/1982 | Evans ............................ 70/165 |
| 4,453,388 | 6/1984 | Baker et al. .................. 70/165 |
| 4,527,406 | 7/1985 | Baker ............................ 70/165 |
| 4,690,292 | 9/1987 | Henning ........................ 220/210 |
| 4,702,386 | 10/1987 | Boehmer et al. .............. 220/86 R |
| 4,715,509 | 12/1987 | Ito et al. ...................... 220/86 R |
| 4,754,627 | 7/1988 | Butler, III .................... 70/158 |
| 4,762,247 | 8/1988 | Temmesfeld .................. 220/303 |
| 4,881,655 | 11/1989 | Jansky et al. ................ 220/209 |
| 4,986,097 | 1/1991 | Derman ........................ 70/158 |
| 4,986,439 | 1/1991 | Ott et al. ...................... 220/34 |
| 5,042,678 | 8/1991 | Munguia ...................... 220/DIG. 33 |
| 5,145,081 | 9/1992 | Gravino ........................ 220/86.2 |
| 5,195,566 | 3/1993 | Ott et al. ...................... 141/312 |

FOREIGN PATENT DOCUMENTS

| | | | |
|---|---|---|---|
| 738142 | 8/1943 | Germany ...................... | 70/165 |
| 302568 | 5/1929 | United Kingdom ........... | 70/165 |

*Primary Examiner*—Darnell M. Boucher
*Attorney, Agent, or Firm*—Leydig, Voit & Mayer, Ltd.

[57] ABSTRACT

The closure includes a base adapted to be screwed into a fuel tank filler pipe and having a fill opening normally closed by a hinged flapper which is opened when a fuel nozzle is inserted into the fill opening. The base is shielded against being manually gripped and unscrewed from the filler pipe by a cover also having a fill opening and normally supported for free rotation on the base so that turning of the cover normally is ineffective to unscrew the base. When a key is inserted into the cover, it couples the cover and the base for rotation as a unit and thereby enables the base to be unscrewed from the filler pipe. The same key also is used to actuate a locking device for locking the flapper in its closed position.

14 Claims, 3 Drawing Sheets

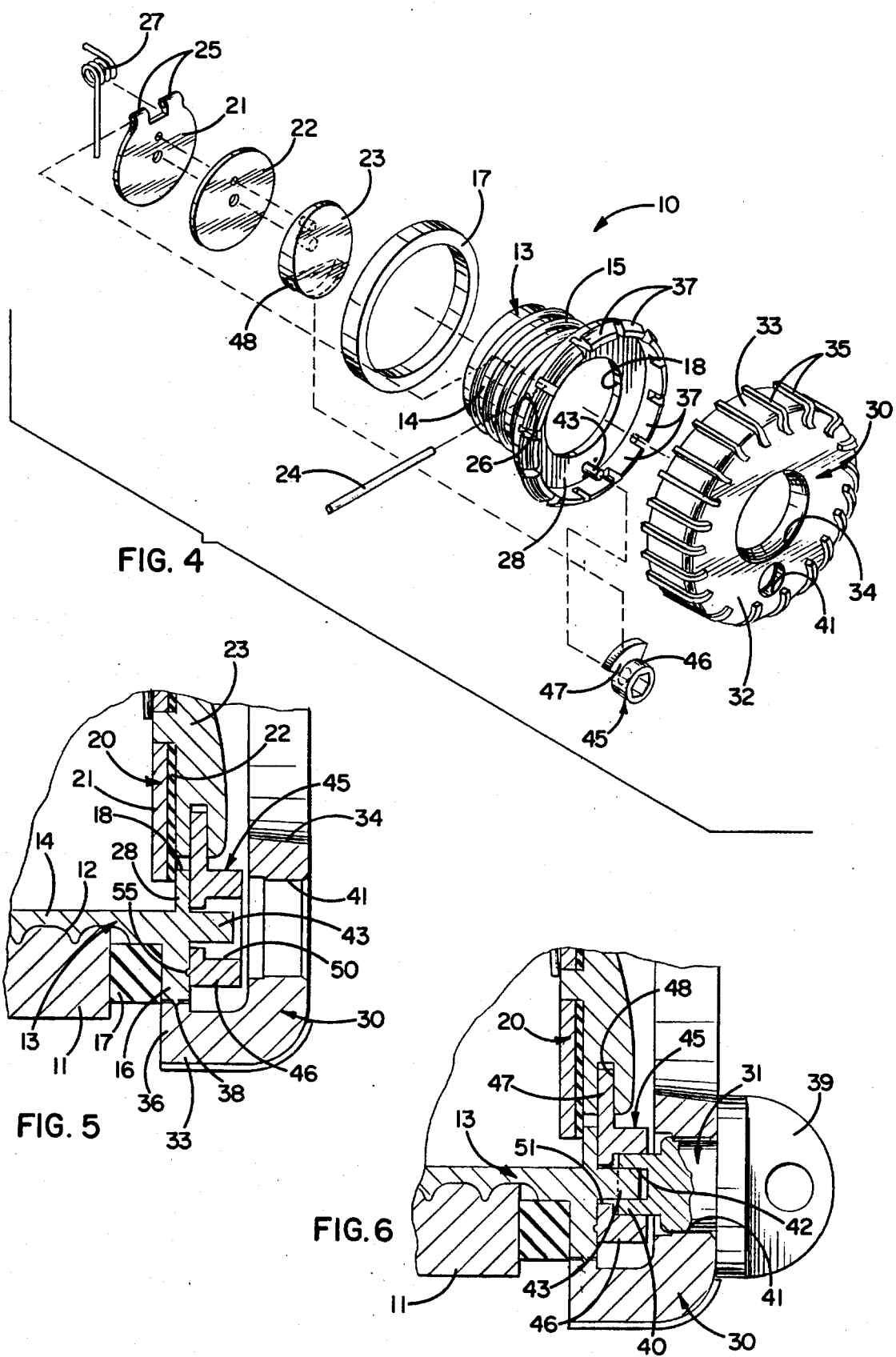

LOCKABLE CLOSURE FOR A FUEL TANK FILLER PIPE

BACKGROUND OF THE INVENTION

This invention relates generally to a closure for the filler pipe of a vehicle fuel tank which is adapted to be filled by a pump nozzle inserted into the outer end portion of the filler pipe.

More specifically, the invention relates to so-called capless closures of the type which eliminate the need for manually removing a gas cap to fuel the vehicle and then replacing the cap when the fueling is complete. One such closure is disclosed in Davidson U.S. Pat. No. 2,503,031, that closure including a spring-loaded flapper valve which is adapted to be pivoted to an open position by the fuel nozzle when the nozzle is inserted into a fill opening in the closure. Gravino U.S. Pat. No. 5,145,081 also discloses a capless closure with a spring-loaded flapper and, in the case of the Gravino closure, the flapper is adapted to be selectively locked and sealed in its closed position relative to the fill opening in order to prevent moisture and road contaminants from entering the tank.

Although not specifically disclosed by the Davidson or Gravino patents, capless closures of the foregoing type frequently are attached to the filler pipe by screwing the closure onto the pipe. Unless the closure is protected by a locked fuel door on the vehicle, there has been no provision in prior commercial capless closures for preventing theft of the closure by a person who simply unscrews the closure from the filler pipe. In a commercial sense, capless closures are relatively new and are becoming increasingly popular in general and particularly on rental cars. Certain persons who rent such cars are attracted by the uniqueness of the closure and frequently remove the same for use on their own car.

Also, prior commercial capless closures make no provision for preventing unauthorized siphoning of fuel unless, again, the closure is protected by a locked fuel door. Accordingly, such closures lead to the theft of fuel.

SUMMARY OF THE INVENTION

The general aim of the present invention is to provide a new and improved screw-on capless closure which is protected against being unscrewed from the filler pipe except by an authorized person possessing an appropriate key.

A more detailed object of the invention is to achieve the foregoing by providing a capless closure having a screw-on base with a fill opening and with a valve (e.g., a flapper valve) for normally closing the fill opening; having a cover with a fill opening aligned with the fill opening of the base, the cover normally being rotatable on the base and being operable to shield the base against being manually gripped and unscrewed; and having a key which, when inserted into the cover and the base, couples the two together for rotation in unison to permit unscrewing of the closure from the filler pipe.

The invention also resides in the provision of a closure in which a relatively simple key serves as the sole torque-transmitting instrument between a cover and a base so as to avoid the need for expensive locks with tumblers and the like.

An important object of the invention is to advantageously use the same key which couples the cover and the base to also effect locking and unlocking of means for securely holding the valve in its closed position to better seal the valve and to discourage unauthorized siphoning of the fuel.

These and other objects and advantages of the invention will become more apparent from the following detailed description when taken in conjunction with the accompanying drawings.

BRIEF DESCRIPTION OF THE DRAWINGS

FIG. 4 is an exploded perspective view of the components of the closure.

FIG. 5 is an enlarged view of certain components shown in FIG. 2.

FIG. 6 is a view similar to FIG. 5 but shows the key inserted into the cover to permit unscrewing of the closure or to permit unlocking of the valve.

Figure 1:
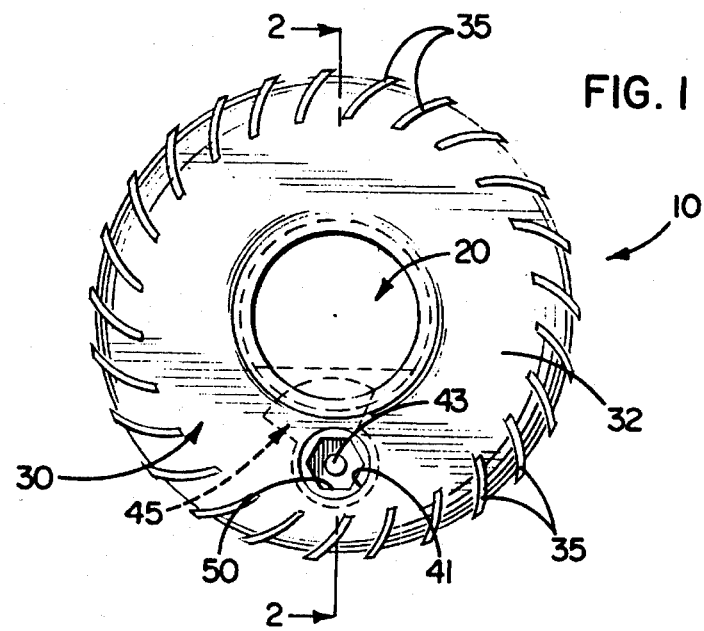
FIG. 1 is a plan view of a new and improved capless closure incorporating the unique features of the present invention.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the closure 10 of the present invention has been shown in the drawings in conjunction with the filler pipe 11 of the fuel tank (not shown) of a motor vehicle. In this specific instance, the outer end portion of the filler pipe is internally threaded as indicated at 12 to enable the closure to be screwed into the pipe. It will be appreciated, however, that the filler pipe could be equipped with a bayonet fitting enabling the closure to be screwed onto the pipe by rotating the closure through either a quarter turn or a half turn.

The closure 10 includes a one-piece base 13 molded of plastic and having a neck 14 which, in this particular instance, is formed with external threads 15 (FIG. 4) enabling the neck to be screwed into the filler pipe 11. Formed integrally with and extending radially outwardly from the outer end of the neck is a flange 16 (FIG. 2) which compresses an annular sealing gasket 17 (FIG. 2) against the outer end of the filler pipe when the neck is screwed into the pipe. The neck is tubular and thus defines a fill opening 18 (FIG. 4) which communicates with the pipe.

Figure 2:
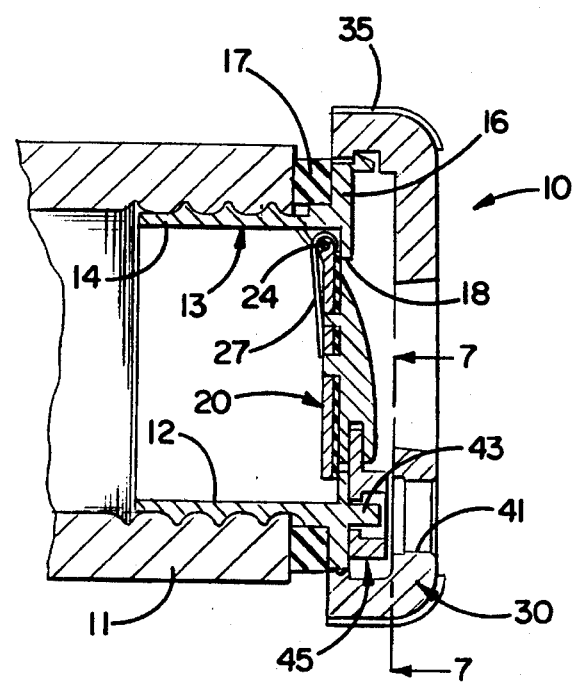
FIG. 2 is a fragmentary cross-section taken substantially along the line 2—2 of FIG. 1 and shows the valve of the closure in a closed position.
Figure 3:
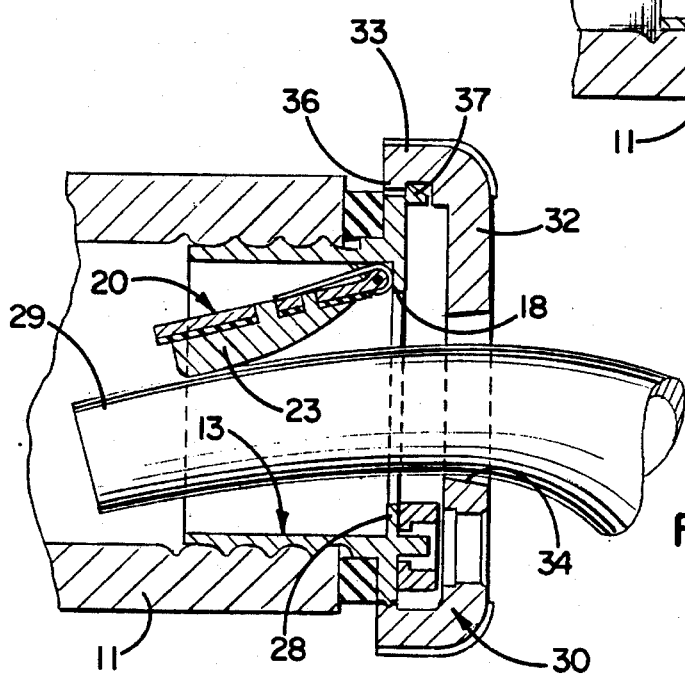
FIG. 3 is a view similar to FIG. 2 but shows the valve in an open position.
Figure 7:
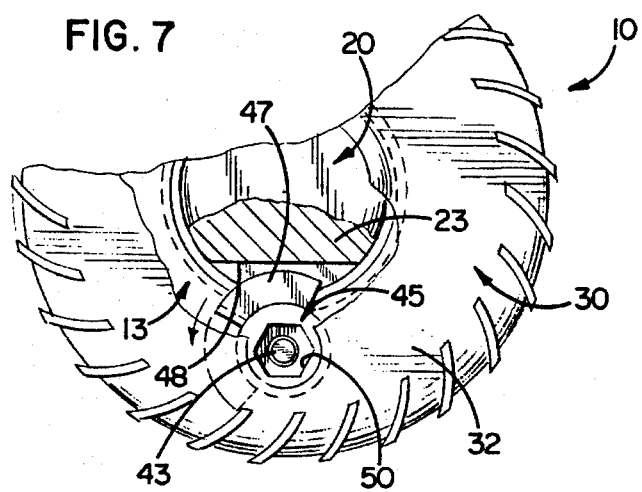
FIG. 7 is an enlarged view generally similar to FIG. 1 with certain parts broken away and shown in section.
Figure 8:
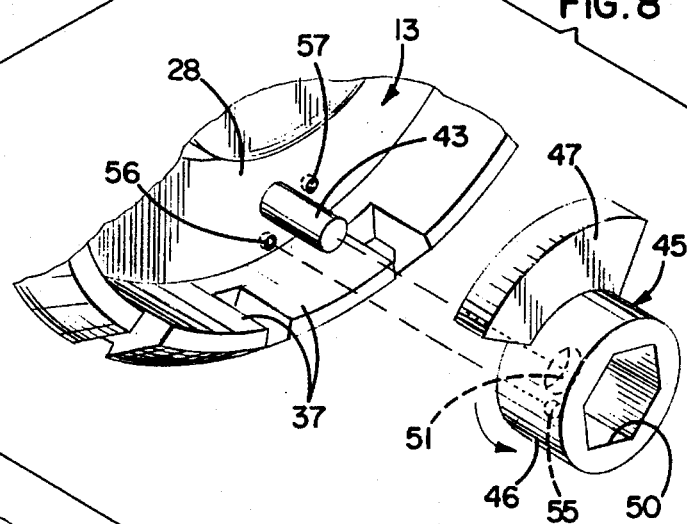
FIG. 8 is an exploded perspective view showing the valve locking device in its locked position.

As shown most clearly in FIGS. 2–4, the fill opening 18 is adapted to be selectively closed and opened by a valve member 20 which herein is a flapper valve. The flapper 20 includes a base disc 21 (FIG. 4), an elastomeric sealing disc 22 and a deflector plate 23 which are sandwiched together in that order. A hinge pin 24 extends through ears 25 of the disc 21 and holes 26 in the base 13 to support the flapper 20 for swinging between a normal closed position (FIG. 2) and an open position (FIG. 3), the flapper being urged to its closed position by a torsion spring 27 encircling the pin and having tangs loaded against the base and the disc 21.

When the flapper 20 is closed as shown in FIG. 5, the gasket 22 seats against a radially inwardly projecting flange 28 of the base 13 and thereby seals the fill opening 18. The deflector plate 23 is sized such that it projects through the fill opening when the flapper is closed. When a fuel nozzle 29 is inserted into the fill opening, it engages the deflector plate and swings the flapper to an open position (FIG. 3) permitting the nozzle to enter the filler pipe 11. Upon removal of the nozzle, the spring 27 returns the flapper to its closed position.

The closure 10 as described thus far is known as a capless closure in that fueling may be effected through the fill opening 18 without need of first removing and then replacing a conventional gas cap. In accordance with one aspect of the present invention, the capless closure 10 is made resistant to theft by a person who might attempt to unscrew the closure from the filler pipe 11. For this purpose, provision is made of a cover 30 which shields the base 13 and prevents a person from manually gripping and unscrewing the base. The cover normally is freely rotatable on the base and thus turning of the cover normally is not effective to produce unscrewing of the base. By inserting a special key 31 (FIG. 6) into the cover and the base, the two may be coupled for rotation in unison thereby enabling an authorized person to unscrew the closure.

More specifically, the cover 30 is a one-piece member molded of plastic and includes a circular plate 32 and an annular skirt 33 (FIG. 4). The plate is formed with a central fill opening 34 which, when the cover is assembled with the base 13, is aligned with the fill opening 18 in the base so as to accept the nozzle 29. Angularly spaced ribs 35 preferably are molded around the skirt and the outer periphery of the plate to facilitate gripping and turning of the cover.

The free edge of the skirt 33 of the cover 30 is formed with a radially inwardly projecting flange 36 (FIG. 3). The cover is adapted to be assembled with the base 13 by telescoping the skirt over a series of angularly spaced and somewhat flexible lugs 37 (FIGS. 3 and 4) molded integrally with and projecting axially from the periphery of the flange 28 of the base. As an incident to such telescoping, the flange 36 snaps beneath the lugs to prevent axial separation of the cover from the base. At the same time, a bead-and-groove connection 38 (FIG. 5) on the flanges 16 and 36 snaps into interfitting relation to rotatably support the cover on the base. The bead of the connection 38 may be formed on the flange 16 and the groove formed in the flange 36 or vice versa.

By virtue of the bead-and-groove connection 38, the cover 30 is capable of rotating freely on the base 13. As a result, the base normally cannot be unscrewed from the filler pipe 11 by rotating the cover. By using the key 31, however, the cover and the base may be rotated as a unit to permit installation and removal of the closure 10.

Herein, the key 31 includes a head 39 (FIG. 6) and an elongated shank 40. The shank is adapted to be inserted through a cylindrical hole 41 formed through the plate 32 of the cover 30 in radially offset relation to the fill opening 34. When the shank 40 is inserted through the hole 41, an axially extending cylindrical hole 42 in the shank moves into telescoping relation with an axially extending projection 43 formed integrally with the base 13 between the flanges 16 and 28. Herein, the projection 43 is a cylindrical pin.

As a result of the shank 40 of the key 31 bearing against the wall of the hole 41 and the pin 43 bearing against the wall of the hole 42, a positive connection is established between the cover 30 and the base 13 so that rotation of the cover is transmitted to the base for purposes of screwing the base into or unscrewing the base from the filler pipe 11. Once the closure 10 has been installed and the key 31 removed, the cover simply rotates idly on the base and its plate 32 and skirt 33 shield the base against being directly gripped and turned. Accordingly, the closure 10 is theft-resistant.

It will be appreciated that other arrangements could be used to selectively couple the cover 30 and the base 13 for rotation in unison. For example, a specially configured pin serving as a key could be inserted radially into holes in the skirt 33 and an opposing wall of the base. Alternatively, the cover could be equipped with a pawl which normally ratchets freely on the base when the cover is turned in an unscrewing direction but which catches against the base when the cover is turned in the opposite direction. With such an arrangement, the closure 10 could be installed without use of a key but could be removed only when the key is inserted to couple the cover and the base for conjoint rotation.

It will also be appreciated that the invention as described thus far is applicable to closures other than capless closures, for example, a closure having a screw-on base and a normally freely rotatable cover without a fill opening. In such a closure, the relatively simple key 31 serves as the sole torque-transmitting instrument between the cover and the base and thus theft of the closure can be deterred without need of equipping the closure with an expensive tumbler-type lock.

According to a further aspect of the invention, the same key 31 which is used to couple the cover 30 and the base 13 is also advantageously utilized to effect locking of the flapper 20 in and unlocking of the flapper from its closed position. To these ends, the closure 10 is equipped with a locking device 45 preferably molded of plastic and having a central hub 46 and a radially projecting locking ear 47. The hub is rotatably supported on the base 13 by the pin 43 and may be turned about the axis of the pin to a locked position (FIGS. 5–8) in which the ear 47 extends into a radially outwardly opening slot 48 formed in the deflector plate 23 between the ends thereof. When the ear is in the slot, it locks the flapper 20 in secure sealing engagement with the flange 28 and prevents moisture and road contaminants from seeping past the flapper. Also, the locking action prevents unauthorized opening of the flapper and siphoning of the fuel. The ear 47 and the slot 48 may be shaped such that the ear acts against the slot to cam the flapper tightly against the flange 28 when the ear is turned toward its locked position and enters the slot.

By turning the locking device 45 in one direction (herein, counterclockwise), the ear 47 is moved to an unlocked position out of the slot 48 so as to permit opening of the flapper 20 upon insertion of the nozzle 29 through the fill openings 34 and 18. To enable turning of the locking device, the hub 46 is formed with a noncircular (e.g., hexagonal) socket 50 (FIGS. 5 and 8) into which the pin 43 extends, the hub also being formed with a circular hole 51 at the closed end of the socket for receiving the pin to rotatably support the hub. The shank 40 of the key 31 also is formed with a hexagonal external shape and is sized to telescope closely within the socket 50. Accordingly, when the shank is inserted into the socket and the key is turned, the locking device 45 is turned between its locked and unlocked positions. During such turning, the hole 42 in the shank simply turns idly on the pin 43. The pin, however, prevents a standard hex wrench (e.g., an Allen wrench) from being inserted into the socket to turn the locking device. It will be appreciated that the shank 40, the hole 42, the pin 43 and the socket 50 may be of other shapes which perform the designated functions so that a variety of keys may be provided.

Figure 9:
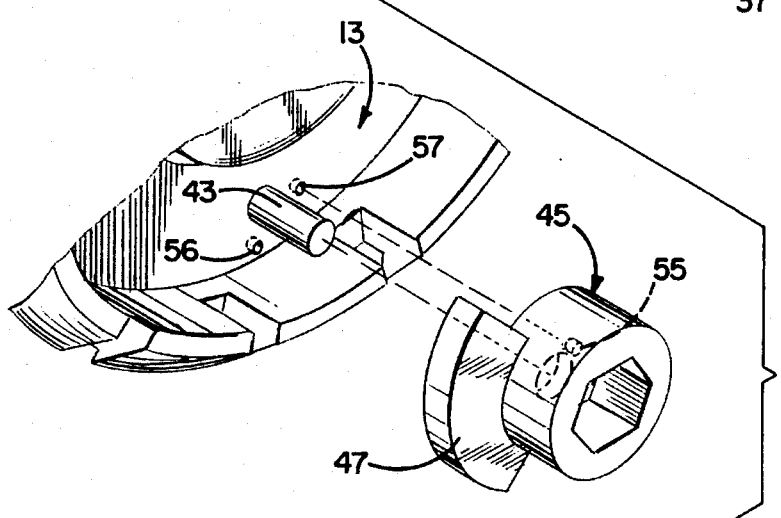
FIG. 9 is a view similar to FIG. 8 but shows the valve locking device in its unlocked position.

Advantageously, detent means are provided for releasably holding the locking device 45 in each of its locked and unlocked positions. In this instance, the detent means comprise a nib 55 (FIGS. 5, 8 and 9) molded integrally with and projecting axially from the hub 46 and further comprise a pair of angularly spaced pockets 56 and 57 formed in the flanges 16 and 28 adjacent the pin 43. When the locking device 45 is in its locked position, the nib 55 seats releasably in the pocket 56 (see FIG. 8) to prevent vibration and the like from turning the locking device. As the locking device is turned counterclockwise, the nib snaps out of the pocket 56 and then snaps into the pocket 57 to hold the locking device in its unlocked position and thereby insure that the ear 47 does not interfere with closing of the flapper 20 when the nozzle 29 is withdrawn from the filler pipe 11.

From the foregoing, it will be apparent that the present invention brings to the art a closure 10 which is theft-resistant by virtue of the cover 30 shielding the base 13 and preventing unscrewing thereof until the cover and the base are directly coupled by the key 31. The same key also is used to lock and unlock the flapper 20 and thus the key serves a dual purpose.

I claim:

1. A closure for the outer end portion of the filler pipe of a fuel tank adapted to be filled by a nozzle inserted into the filler pipe, said closure comprising a base having inner and outer end portions, the inner end portion of said base being adapted to be screwed onto and unscrewed from the filler pipe when the base is rotated in first and second directions, respectively, relative to the filler pipe, said base having a fill opening extending therethrough, a valve member mounted on said base and movable between open and closed positions relative to said fill opening, said valve member normally being in said closed position and being moved to said open position as an incident to insertion of said nozzle into said filler pipe via said fill opening, a cover rotatably supported on the outer end portion of said base and having a fill opening aligned with the fill opening in said base, said cover shielding said base against being manually gripped and rotated and normally being freely rotatable relative to said base in said second direction, and key means selectively operable to couple said cover and said base for rotation in unison in said second direction thereby to enable turning of said cover in said second direction to effect unscrewing of said base from said filler pipe.

2. A closure as defined in claim 1 in which a hole is formed through said cover, said key means having a shank insertable through said hole, and means on said base and adapted to telescope with said shank to couple said cover and said base for rotation in unison in said second direction.

3. A closure as defined in claim 1 further including locking means on said base and shiftable between locked and unlocked positions, said locking means being operable when in said locked position to hold said valve member in said closed position and being operable when in said unlocked position to release said valve member for movement to said open position, said key means being manually movable to shift said locking means between said locked and unlocked positions.

4. A closure as defined in claim 3 in which a hole is formed through said cover, said key means having a shank insertable through said hole, means on said base and adapted to telescope with said shank to couple said cover and said base for rotation in unison in said second direction, and said locking means including means adapted to telescope non-rotatably with said shank to enable said key means to be used to shift said locking means between said locked and unlocked positions.

5. A closure as defined in claim 4 in which said shank includes a non-circular outer periphery and is formed with an axially extending hole, said locking means having a non-circular socket adapted to telescopically and non-rotatably receive said shank, and said means on said base comprising a projection fixed to said base, extending into said socket and adapted to telescope rotatably into said hole in said shank.

6. A closure as defined in claim 3 further including detent means for releasably holding said locking means in said locked position.

7. A closure as defined in claim 6 further including detent means for releasably holding said locking means in said unlocked position.

8. A closure as defined in claim 3 in which said valve member is a flapper pivotally connected to said base to swing between said open and closed positions, spring means biasing said flapper to said closed position, said locking means comprising an ear rotatable between said locked and unlocked positions, and a slot in said flapper and receiving said ear when said ear is in said locked position whereby said ear and said slot coact to lock said flapper in said closed position.

9. A closure for the outer end portion of the filler pipe of a fuel tank adapted to be filled by a nozzle inserted into the filler pipe, said closure comprising a base having inner and outer end portions, the inner end portion of said base being adapted to be screwed onto and unscrewed from said filler pipe when the base is rotated in first and second directions, respectively, relative to the filler pipe, said base having a fill opening extending therethrough, a flapper pivotally connected to said base to swing between open and closed positions relative to said opening, said flapper seating against said base and closing said opening when said flapper is in said closed position, a spring biasing said flapper toward said closed position, said flapper being engaged by said nozzle and being swung to said open position by said nozzle when said nozzle is inserted into said filler pipe via said fill opening, locking means normally disposed in a locked position locking said flapper in said closed position and selectively rotatable to an unlocked position to release said flapper for swinging to said open position, a cover rotatably supported on said base and having a fill opening aligned with the fill opening in the base, said cover shielding said base against being manually gripped and rotated and normally being freely rotatable relative to said base in said second direction, key means selectively insertable into said cover to couple said cover and said base for rotation in unison whereby turning of said cover in said second direction effects unscrewing of said base from said filler pipe, and said key means being operable when inserted into said cover and turned manually to rotate said locking means between said locked and unlocked positions.

10. A closure as defined in claim 9 in which a hole is formed through said cover, said key means having a shank insertable through said hole, means on said base and adapted to telescope with said shank to couple said cover and said base for rotation in unison in said second direction, and said locking means including means adapted to telescope non-rotatably with said shank to enable said key means to be used to shift said locking means between said locked and unlocked positions.

11. A closure as defined in claim 10 in which said shank includes a non-circular outer periphery and is formed with an axially extending hole, said locking means having a non-circular socket adapted to telescopically and non-rotatably receive said shank, and said means on said base comprising a projection fixed to said base, extending into said socket and adapted to telescope rotatably into said hole in said shank.

12. A closure as defined in claim 9 further including detent means for releasably holding said locking means in said unlocked position.

13. A closure as defined in claim 12 further including detent means for releasably holding said locking means in said locked position.

14. A closure for the outer end portion of the filler pipe of a fuel tank adapted to be filled by a nozzle inserted into the filler pipe, said closure comprising a base having inner and outer end portions, the inner end portion of said base being adapted to be screwed onto and unscrewed from the filler pipe when the base is rotated in first and second directions, respectively, relative to the filler pipe, a cover supported on the outer end portion of said base, said cover shielding said base against being manually gripped and rotated and normally being freely rotatable relative to said base in said second direction, and key means selectively insertable into and removable from said cover and said base and operable when inserted into said cover and said base to couple said cover and said base for rotation in unison in said second direction thereby to enable turning of said cover in said second direction to effect unscrewing of said base from said filler pipe, the key means being the sole instrument which transmits torque from said cover to said base during turning of said cover in said second direction.

* * * * *